(12) United States Patent
Ni

(10) Patent No.: US 12,452,741 B2
(45) Date of Patent: Oct. 21, 2025

(54) DATA TRANSMISSION METHOD AND APPARATUS

(71) Applicant: DATANG MOBILE COMMUNICATIONS EQUIPMENT CO., LTD., Beijing (CN)

(72) Inventor: Chunlin Ni, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 972 days.

(21) Appl. No.: 17/602,257

(22) PCT Filed: Feb. 17, 2020

(86) PCT No.: PCT/CN2020/075614
§ 371 (c)(1),
(2) Date: Oct. 7, 2021

(87) PCT Pub. No.: WO2020/220795
PCT Pub. Date: Nov. 5, 2020

(65) Prior Publication Data
US 2022/0167219 A1    May 26, 2022

(30) Foreign Application Priority Data
Apr. 29, 2019    (CN) .......................... 201910354332.2

(51) Int. Cl.
*H04W 36/00* (2009.01)

(52) U.S. Cl.
CPC ................ *H04W 36/0055* (2013.01)

(58) Field of Classification Search
None
See application file for complete search history.

(56) References Cited

U.S. PATENT DOCUMENTS 11,924,737 B2 * 3/2024 Huang .................. H04W 8/08
2011/0138033 A1 * 6/2011 Yang ........................ H04W 8/02
709/223

(Continued)

FOREIGN PATENT DOCUMENTS

CN        103609171 A       2/2014
CN        103875275 A       6/2014
(Continued)

OTHER PUBLICATIONS

Huawei et al., "Flow based QoS framework for E-UTRA connected to 5GC", 3GPP TSG-RAN WG2 Meeting #99, Berlin, Germany, Aug. 21-25, 2017, total 6 pages, R2-1708400.
(Continued)

*Primary Examiner* — Mariela Vidal Carpio
(74) *Attorney, Agent, or Firm* — KILPATRICK TOWNSEND & STOCKTON LLP

(57) ABSTRACT

A data communication method and apparatus are disclosed. The method includes: a first base station receiving address information of a Transport network layer (TNL) sent by a second base station; the first base station receiving uplink data sent by a terminal device, the uplink data corresponding to a quality of service (QOS) stream; when the uplink data needs to be borne by a default data radio bearer (DRB) of the first base station, and a general packet radio service tunneling protocol (GTP) channel corresponding to the QoS stream is established on the second base station, the first base station establishing a connection with the second base station according to the address information, to transmit the uplink data borne on the default DRB to the second base station, and then transmit the uplink data to a core network device through the GTP channel.

4 Claims, 9 Drawing Sheets

(56) References Cited

U.S. PATENT DOCUMENTS

| | | | |
|---|---|---|---|
| 2015/0282017 A1* | 10/2015 | Wang | H04W 8/02 370/331 |
| 2015/0289302 A1* | 10/2015 | Xu | H04L 65/102 370/329 |
| 2015/0341984 A1 | 11/2015 | Wang et al. | |
| 2015/0351139 A1* | 12/2015 | Zhang | H04L 5/0051 370/329 |
| 2015/0359019 A1* | 12/2015 | Chen | H04W 36/0058 370/329 |
| 2015/0373755 A1* | 12/2015 | Xu | H04W 76/10 370/329 |
| 2016/0212775 A1* | 7/2016 | Xu | H04W 76/10 |
| 2018/0007591 A1* | 1/2018 | Xu | H04W 36/0069 |
| 2018/0035339 A1* | 2/2018 | Mitsui | H04W 72/04 |
| 2018/0092140 A1* | 3/2018 | Dong | H04W 76/12 |
| 2018/0279390 A1* | 9/2018 | Zhang | H04W 76/10 |
| 2019/0190882 A1* | 6/2019 | Engström | H04L 69/14 |
| 2019/0357076 A1* | 11/2019 | Han | H04W 28/0268 |
| 2020/0322787 A1* | 10/2020 | Sivavakeesar | H04W 24/02 |
| 2020/0344666 A1* | 10/2020 | Wang | H04L 69/324 |
| 2020/0344843 A1* | 10/2020 | Zhu | H04W 40/22 |
| 2021/0185569 A1* | 6/2021 | Hu | H04W 36/144 |
| 2021/0212169 A1* | 7/2021 | Hu | H04W 92/20 |
| 2021/0314060 A1* | 10/2021 | Shi | H04B 7/18504 |
| 2022/0095397 A1* | 3/2022 | Mildh | H04W 92/24 |
| 2022/0124846 A1* | 4/2022 | Wang | H04W 28/0268 |

FOREIGN PATENT DOCUMENTS

| | | |
|---|---|---|
| CN | 106941733 A | 7/2017 |
| CN | 108282817 A | 7/2018 |
| CN | 108377567 A | 8/2018 |
| CN | 108390830 A | 8/2018 |
| CN | 108632855 A | 10/2018 |
| CN | 109479334 A | 3/2019 |
| CN | 109587825 A | 4/2019 |

OTHER PUBLICATIONS

Huawei et al., "QoS Aspects for MR-DC and NR DC", 3GPP TSG-RAN WG2#104, Spokane, US, Oct. 12-16, 2018, total 3 pages, R2-1817513(Revsion of R2-1814307).

Qualcomm Incorporated,"Flow QoS Principles", 3GPP TSG-RAN WG3 Meeting #94,Reno, US, 14-1e Nov. 2016, total 5 pages, R3-162825.

* cited by examiner

DATA TRANSMISSION METHOD AND APPARATUS

CROSS-REFERENCE OF RELATED APPLICATIONS

This application is a US National Stage of International Application No. PCT/CN2020/075614, filed Feb. 17, 2020, which claims priority to Chinese Patent Application No. 201910354332.2, filed with the China National Intellectual Property Administration on Apr. 29, 2019 and entitled "Data Communication Method and Apparatus", which is hereby incorporated by reference in its entirety.

FIELD

The present application relates to the field of communication technologies, and particularly to a data communication method and device.

BACKGROUND

In the data communication process, the core network may establish one or more Protocol Data Unit (PDU) sessions for each terminal device. A PDU session may include Quality of Service (QoS) streams; and for a PDU session, a network device may establish one or more Data Radio Bearers (DRBs) for a terminal device to transmit and receive data packets of the terminal device. If a downlink data packet is to be sent to the terminal device, the network device may establish a DRB and use the DRB to transmit received downlink data packet when receiving the data packet to be sent to the terminal device. For example, referring to FIGS. 1, Q1 and Q2 correspond to DRB1 and Q3 corresponds to DRB2 on a Master Node (MN), and Q4 and Q5 correspond to DRB1 and Q6 and Q7 correspond to DRB2 on a Secondary Node (SN), where Q is the abbreviation for the QoS stream. If an uplink data packet is to be sent from the terminal device to the core network through the network device and the terminal device does not obtain the mapping relationship between uplink QoS streams and DRBs configured by the network device, the terminal device may perform the uplink data transmission through a default DRB configured by the network device for each PDU session.

In the case of Dual Connectivity (DC), the default DRB may be established on the master base station or on the secondary base station. Referring to FIG. 1, the default DRB is established on the secondary base station, and the terminal device has the uplink data that needs to be uploaded to the core network through the master base station. It is assumed that the uplink data corresponds to Q1 but the uplink mapping relationship between Q1 and DRB has not been established. In this case, the uplink data needs to be borne on the default DRB, but the General Packet Radio Service (GPRS) Tunneling Protocol (GTP) channel corresponding to Q1 is established on the master base station, therefore the uplink data cannot be transmitted to the core network device.

SUMMARY

Embodiments of the present application provide a data communication method and apparatus, to improve the success rate of data communication to the core network device.

In a first aspect, the present application provides a data communication method, including: receiving, by a first base station, address information of a Transport Network Layer (TNL) sent by a second base station; receiving, by the first base station, uplink data, where the uplink data corresponds to a Quality of Service (QoS) stream; establishing, by the first base station, a connection with the second base station according to the address information when the uplink data needs to be borne by a default Data Radio Bearer (DRB) of the first base station and a General packet radio service Tunneling Protocol (GTP) channel corresponding to the QoS stream is established on the second base station, to transmit the uplink data borne on the default DRB to the second base station and then transmit the uplink data to a core network device through the GTP channel.

In an embodiment of the present application, when the uplink mapping relationship between the QoS stream corresponding to the uplink data received by the first base station and the DRB is not established and the GTP channel corresponding to the QoS stream is established on the second base station, the first base station establishes a forwarding channel according to the address information, transmits the uplink data borne on the default DRB to the second base station, and then uploads the uplink data to the core network through the GTP channel on the second base station, and solving the problem in the related art that the first base station cannot transmit the uplink data to the core network, where the uplink data needs to be borne by the default DRB and the GPT channel corresponding to the uplink data is established on the node where the non-default DRB is located, and improving the success rate of data transmission to the core network device.

In a possible design, the first base station is a secondary base station, and the second base station is a master base station.

In a possible design, receiving, by the first base station, the address information of the TNL sent by the second base station, includes: receiving, by the secondary base station, a secondary base station addition request message sent by the master base station, where the secondary base station addition request message carries indication information for instructing the secondary base station to establish the default DRB and the address information; or receiving, by the secondary base station, a secondary base station modification request message sent by the master base station, where the secondary base station modification request message carries indication information for instructing the secondary base station to establish the default DRB and the address information; correspondingly, the method further includes: establishing, by the secondary base station, the default DRB according to the indication information.

The data communication method provided by an embodiment of the present application may be applied to a scenario where a dual connection is to be established, or may be applied to a scenario where a dual connection has been established.

In an implementation process, when applied to a scenario where a dual connection is to be established, the master base station determines whether to establish the default DRB on the master base station or the secondary base station. As an example, the master base station determines to establish the default DRB on the secondary base station, and then carries the indication information for instructing the secondary base station to establish the default DRB and the address information in the secondary base station addition request message. After receiving the addition request message, the secondary base station feeds back the secondary base station addition request acknowledgement message to the master base station, and establishes a default DRB at the same time.

When applied to a scenario where a dual connection has been established, the master base station may modify the establishment position of the default DRB by initiating a secondary base station modification process. As an example, the master base station determines to establish the default DRB on the secondary base station, and then carries the indication information for instructing the secondary base station to establish the default DRB and the address information in the modification request message. After receiving the secondary base station modification request message, the secondary base station feeds back the secondary base station modification request acknowledgement message to the master base station, and establishes a default DRB at the same time.

In a possible design, the method further includes: sending, by the secondary base station, a secondary base station modification request message to the master base station, where the secondary base station modification request message carries indication information for indicating that the default DRB is established on the secondary base station; correspondingly, receiving, by the first base station, the address information of the TNL sent by the second base station, includes: receiving, by the secondary base station, a secondary base station modification request acknowledgement message sent by the master base station, where the secondary base station modification request acknowledgement message carries the address information.

When the data communication method provided by an embodiment of the present application is applied to a scenario where a dual connection has been established, the secondary base station may initiate a secondary base station modification process to modify the establishment position of the default DRB. As an example, the secondary base station determines to establish the default DRB on the secondary base station, and then may carry the indication information for indicating that the default DRB is established on the secondary base station in the secondary base station modification request message; in this case, the secondary base station may receive a secondary base station modification request acknowledgement message sent by the master base station, where the secondary base station modification request acknowledgement message carries the address information.

In a possible design, the first base station is a master base station, and the second base station is a secondary base station.

In a possible design, the method further includes: sending, by the master base station, a secondary base station addition request message to the secondary base station, where the secondary base station addition request message carries indication information for indicating that the default DRB is established on the master base station; correspondingly, receiving, by the first base station, the address information of the TNL sent by the second base station, includes: receiving, by the master base station, a secondary base station addition request acknowledgement message sent by the secondary base station, where the secondary base station addition request acknowledgement message carries the address information.

When the data communication method provided by an embodiment of the present application is applied to a scenario where a dual connection is to be established, the master base station determines whether to establish the default DRB on the master base station or the secondary base station. As an example, the master base station determines to establish the default DRB on the master base station, then establishes the default DRB, and carries the indication information for indicating that the default DRB is established on the master base station in the secondary base station addition request message. In this case, the master base station may receive a secondary base station addition request acknowledgement message sent by the secondary base station, where the secondary base station addition request acknowledgement message carries the address information.

In a possible design, the method further includes: sending, by the master base station, a secondary base station modification request message to the secondary base station, where the secondary base station modification request message carries indication information for indicating that the default DRB is established on the master base station; correspondingly, receiving, by the first base station, the address information of the TNL sent by the second base station, includes: receiving, by the master base station, a secondary base station modification request acknowledgement message sent by the secondary base station, where the secondary base station modification request acknowledgement message carries the address information.

When the data communication method provided by an embodiment of the present application is applied to a scenario where a dual connection has been established, the master base station may modify the establishment position of the default DRB by initiating a secondary base station modification process. As an example, the master base station determines to establish the default DRB on the master base station, then establishes the default DRB, and carries the indication information for indicating that the default DRB is established on the master base station in the modification request message. In this case, the master base station receives a secondary base station modification request acknowledgement message sent by the secondary base station, where the secondary base station modification request acknowledgement message carries the address information.

In a possible design, receiving, by the first base station, the address information of the TNL sent by the second base station, includes: receiving, by the master base station, a secondary base station modification request message sent by the secondary base station, where the secondary base station modification request message carries indication information for instructing the master base station to establish the default DRB and the address information; correspondingly, the method further includes: establishing, by the master base station, the default DRB according to the indication information.

When the data communication method provided by an embodiment of the present application is applied to a scenario where a dual connection has been established, the secondary base station may initiate a secondary base station modification process to modify the establishment position of the default DRB. As an example, the secondary base station determines to establish the default DRB on the master base station, and then may carry the indication information for instructing the master base station to establish the default DRB and the address information in the secondary base station modification request message. After receiving the secondary base station modification request message sent by the secondary base station, the master base station sends a secondary base station modification request acknowledgement message to the secondary base station, and establishes a default DRB at the same time.

In a second aspect, an embodiment of the present application further provides a data communication method, including: determining, by a second base station, that a default Data Radio Bearer (DRB) is established on a first base station; sending, by the second base station, address information of a Transport Network Layer (TNL) to the first base station to establish a connection with the first base station according to the address information when uplink data sent by a terminal device and received by the first base station needs to be borne by the default DRB and a General packet radio service Tunneling Protocol (GTP) channel corresponding to a Quality of Service (QoS) stream of the uplink data is established on the second base station, to transmit the uplink data borne on the default DRB to the second base station and then transmit the uplink data to a core network device through the GTP channel.

In a possible design, the first base station is a secondary base station, and the second base station is a master base station.

In a possible design, sending, by the second base station, the address information of the TNL to the first base station, includes: sending, by the master base station, a secondary base station addition request message to the secondary base station, where the secondary base station addition request message carries indication information for instructing the secondary base station to establish the default DRB and the address information; or sending, by the master base station, a secondary base station modification request message to the secondary base station, where the secondary base station modification request message carries indication information for instructing the secondary base station to establish the default DRB and the address information.

In a possible design, the method further includes: receiving, by the master base station, a secondary base station modification request message sent by the secondary base station, where the secondary base station modification request message carries indication information for indicating that the default DRB is established on the secondary base station; correspondingly, sending, by the second base station, the address information of the TNL to the first base station, includes: sending, by the master base station, a secondary base station modification request acknowledgement message to the secondary base station, where the secondary base station modification request acknowledgement message carries the address information.

In a possible design, the first base station is a master base station, and the second base station is a secondary base station.

In a possible design, the method further includes: receiving, by the secondary base station, a secondary base station addition request message sent by the master base station, where the secondary base station addition request message carries indication information for indicating that the default DRB is established on the master base station; correspondingly, sending, by the second base station, the address information of the TNL to the first base station, includes: sending, by the secondary base station, a secondary base station addition request acknowledgement message to the master base station, where the secondary base station addition request acknowledgement message carries the address information.

In a possible design, the method further includes: receiving, by the secondary base station, a secondary base station modification request message sent by the master base station, where the secondary base station modification request message carries indication information for indicating that the default DRB is established on the master base station; correspondingly, sending, by the second base station, the address information of the TNL to the first base station, includes: sending, by the secondary base station, a secondary base station modification request acknowledgement message to the master base station, where the secondary base station modification request acknowledgement message carries the address information.

In a possible design, sending, by the second base station, the address information of the TNL to the first base station, includes: sending, by the secondary base station, a secondary base station modification request message to the master base station, where the secondary base station modification request message carries indication information for instructing the master base station to establish the default DRB and the address information.

In a third aspect, the present application further provides an apparatus for data communication method, including: a memory, configured to store instructions; a processor, configured to read the instructions stored in the memory to perform: controlling a receiver to receive address information of a Transport Network Layer (TNL) sent by a second base station and uplink data sent by a terminal device, where the uplink data corresponds to a Quality of Service (QoS) stream; establishing a connection with the second base station according to the address information when the uplink data needs to be borne by a default Data Radio Bearer (DRB) of the apparatus and a General packet radio service Tunneling Protocol (GTP) channel corresponding to the QoS stream is established on the second base station, to transmit the uplink data borne on the default DRB to the second base station and then transmit the uplink data to a core network device through the GTP channel.

In a possible design, the apparatus is a secondary base station, and the second base station is a master base station.

In a possible design, when controlling the receiver to receive the address information of the TNL sent by the second base station, the processor is configured to: control the receiver to receive a secondary base station addition request message sent by the master base station, where the secondary base station addition request message carries indication information for instructing the apparatus to establish the default DRB and the address information; or control the receiver to receive a secondary base station modification request message sent by the master base station, where the secondary base station modification request message carries indication information for instructing the apparatus to establish the default DRB and the address information; correspondingly, the processor is further configured to: establish the default DRB according to the indication information.

In a possible design, the apparatus further includes: a transmitter, configured to send a secondary base station modification request message to the master base station, where the secondary base station modification request message carries indication information for indicating that the default DRB is established on the apparatus; correspondingly, when controlling the receiver to receive the address information of the TNL sent by the second base station, the processor is configured to: control the receiver to receive a secondary base station modification request acknowledgement message sent by the master base station, where the secondary base station modification request acknowledgement message carries the address information.

In a possible design, the apparatus is a master base station, and the second base station is a secondary base station.

In a possible design, the apparatus further includes: a transmitter, configured to send a secondary base station addition request message to the secondary base station, where the secondary base station addition request message carries indication information for indicating that the default DRB is established on the apparatus; correspondingly, when controlling the receiver to receive the address information of the TNL sent by the second base station, the processor is configured to: control the receiver to receive a secondary base station addition request acknowledgement message sent by the secondary base station, where the secondary base station addition request acknowledgement message carries the address information.

In a possible design, the apparatus further includes: a transmitter, configured to send a secondary base station modification request message to the secondary base station, where the secondary base station modification request message carries indication information for indicating that the default DRB is established on the apparatus; correspondingly, when controlling the receiver to receive the address information of the TNL sent by the second base station, the processor is configured to: control the receiver to receive a secondary base station modification request acknowledgement message sent by the secondary base station, where the secondary base station modification request acknowledgement message carries the address information.

In a possible design, when controlling the receiver to receive the address information of the TNL sent by the second base station, the processor is configured to: control the receiver to receive a secondary base station modification request message sent by the secondary base station, where the secondary base station modification request message carries indication information for instructing the apparatus to establish the default DRB and the address information; correspondingly, the processor is further configured to: establish the default DRB according to the indication information.

In a fourth aspect, the present application further provides an apparatus for data communication method, including: a memory, configured to store instructions; a processor, configured to read the instructions stored in the memory to perform: determining that a default Data Radio Bearer (DRB) is established on a first base station; controlling a transmitter to send address information of a Transport Network Layer (TNL) to the first base station to establish a connection with the first base station according to the address information when uplink data sent by a terminal device and received by the first base station needs to be borne by the default DRB and a General packet radio service Tunneling Protocol (GTP) channel corresponding to a Quality of Service (QoS) stream of the uplink data is established on the apparatus, to transmit the uplink data borne on the default DRB to the apparatus and then transmit the uplink data to a core network device through the GTP channel.

In a possible design, the first base station is a secondary base station, and the apparatus is a master base station.

In a possible design, when controlling the transmitter to send the address information of the TNL to the first base station, the processor is configured to: control the transmitter to send a secondary base station addition request message to the secondary base station, where the secondary base station addition request message carries indication information for instructing the secondary base station to establish the default DRB and the address information; or control the transmitter to send a secondary base station modification request message to the secondary base station, where the secondary base station modification request message carries indication information for instructing the secondary base station to establish the default DRB and the address information.

In a possible design, the apparatus further includes: a receiver, configured to receive a secondary base station modification request message sent by the secondary base station, where the secondary base station modification request message carries indication information for indicating that the default DRB is established on the secondary base station; correspondingly, when controlling the transmitter to send the address information of the TNL to the first base station, the processor is configured to: control the transmitter to send a secondary base station modification request acknowledgement message to the secondary base station, where the secondary base station modification request acknowledgement message carries the address information.

In a possible design, the first base station is a master base station, and the apparatus is a secondary base station.

In a possible design, the apparatus further includes: a receiver, configured to receive a secondary base station addition request message sent by the master base station, where the secondary base station addition request message carries indication information for indicating that the default DRB is established on the master base station; correspondingly, when controlling the transmitter to send the address information of the TNL to the first base station, the processor is configured to: control the transmitter to send a secondary base station addition request acknowledgement message to the master base station, where the secondary base station addition request acknowledgement message carries the address information.

In a possible design, the apparatus further includes: a receiver, configured to receive a secondary base station modification request message sent by the master base station, where the secondary base station modification request message carries indication information for indicating that the default DRB is established on the master base station; correspondingly, when controlling the transmitter to send the address information of the TNL to the first base station, the processor is configured to: control the transmitter to send a secondary base station modification request acknowledgement message to the master base station, where the secondary base station modification request acknowledgement message carries the address information.

In a possible design, when controlling the transmitter to send the address information of the TNL to the first base station, the processor is configured to: control the transmitter to send a secondary base station modification request message to the master base station, where the secondary base station modification request message carries indication information for instructing the master base station to establish the default DRB and the address information.

In a fifth aspect, the present application further provides an apparatus for data communication method, including: a first receiving device, configured to receive address information of a Transport Network Layer (TNL) sent by a second base station; a second receiving device, configured to receive uplink data sent by a terminal device, where the uplink data corresponds to a Quality of Service (QoS) stream; a first establishment device, configured to establish a connection with the second base station according to the address information when the uplink data needs to be borne by a default Data Radio Bearer (DRB) of the apparatus and a General packet radio service Tunneling Protocol (GTP) channel corresponding to the QoS stream is established on the second base station, to transmit the uplink data borne on the default DRB to the second base station and then transmit it to a core network device through the GTP channel.

In a possible design, the apparatus is a secondary base station, and the second base station is a master base station.

In a possible design, when receiving the address information of the TNL sent by the second base station, the first receiving device is configured to: receive a secondary base station addition request message sent by the master base station, where the secondary base station addition request message carries indication information for instructing the secondary base station to establish the default DRB and the address information; or receive a secondary base station modification request message sent by the master base station, where the secondary base station modification request message carries indication information for instructing the secondary base station to establish the default DRB and the address information; correspondingly, the apparatus further includes: a second establishment device configured to establish the default DRB according to the indication information.

In a possible design, the apparatus further includes: a sending device, configured to send a secondary base station modification request message to the master base station, where the secondary base station modification request message carries indication information for indicating that the default DRB is established on the secondary base station; correspondingly, when receiving the address information of the TNL sent by the second base station, the first receiving device is configured to: receive a secondary base station modification request acknowledgement message sent by the master base station, where the secondary base station modification request acknowledgement message carries the address information.

In a possible design, the apparatus is a master base station, and the second base station is a secondary base station.

In a possible design, the apparatus further includes: a sending device, configured to send a secondary base station addition request message to the secondary base station, where the secondary base station addition request message carries indication information for indicating that the default DRB is established on the master base station; correspondingly, when receiving the address information of the TNL sent by the second base station, the first receiving device is configured to: receive a secondary base station addition request acknowledgement message sent by the secondary base station, where the secondary base station addition request acknowledgement message carries the address information.

In a possible design, the apparatus further includes: a sending device, configured to send a secondary base station modification request message to the secondary base station, where the secondary base station modification request message carries indication information for indicating that the default DRB is established on the apparatus; correspondingly, when receiving the address information of the TNL sent by the second base station, the first receiving device is configured to: receive a secondary base station modification request acknowledgement message sent by the secondary base station, where the secondary base station modification request acknowledgement message carries the address information.

In a possible design, when receiving the address information of the TNL sent by the second base station, the first receiving device is configured to: receive a secondary base station modification request message sent by the secondary base station, where the secondary base station modification request message carries indication information for instructing the apparatus to establish the default DRB and the address information; correspondingly, the apparatus further includes: a second establishment device, configured to establish the default DRB according to the indication information.

In a sixth aspect, the present application further provides an apparatus for data communication method, including: a determining device, configured to determine that a default Data Radio Bearer (DRB) is established on a first base station; a sending device, configured to send address information of a Transport Network Layer (TNL) to the first base station to establish a connection with the first base station according to the address information when uplink data sent by a terminal device and received by the first base station needs to be borne by the default DRB and a General packet radio service Tunneling Protocol (GTP) channel corresponding to a Quality of Service (QoS) stream of the uplink data is established on the apparatus, to transmit the uplink data borne on the default DRB to the apparatus and then transmit it to a core network device through the GTP channel.

In a possible design, the first base station is a secondary base station, and the apparatus is a master base station.

In a possible design, when sending the address information of the TNL to the first base station, the sending device is configured to: send a secondary base station addition request message to the secondary base station, where the secondary base station addition request message carries indication information for instructing the secondary base station to establish the default DRB and the address information; or send a secondary base station modification request message to the secondary base station, where the secondary base station modification request message carries indication information for instructing the secondary base station to establish the default DRB and the address information.

In a possible design, the apparatus further includes: a receiving device, configured to receive a secondary base station modification request message sent by the secondary base station, where the secondary base station modification request message carries indication information for indicating that the default DRB is established on the secondary base station; correspondingly, when sending the address information of the TNL to the first base station, the sending device is configured to: send a secondary base station modification request acknowledgement message to the secondary base station, where the secondary base station modification request acknowledgement message carries the address information.

In a possible design, the first base station is a master base station, and the apparatus is a secondary base station.

In a possible design, the apparatus further includes: a receiving device, configured to receive a secondary base station addition request message sent by the master base station, where the secondary base station addition request message carries indication information for indicating that the default DRB is established on the master base station; correspondingly, when sending the address information of the TNL to the first base station, the sending device is configured to: send a secondary base station addition request acknowledgement message to the master base station, where the secondary base station addition request acknowledgement message carries the address information.

In a possible design, the apparatus further includes: a receiving device, configured to receive a secondary base station modification request message sent by the master base station, where the secondary base station modification request message carries indication information for indicating that the default DRB is established on the master base station; correspondingly, when sending the address information of the TNL to the first base station, the sending device is configured to: send a secondary base station modification request acknowledgement message to the master base station, where the secondary base station modification request acknowledgement message carries the address information.

In a possible design, when sending the address information of the TNL to the first base station, the sending device is configured to: send a secondary base station modification request message to the master base station, where the secondary base station modification request message carries indication information for instructing the master base station to establish the default DRB and the address information.

In a seventh aspect, a computer storage medium is provided, and the computer storage medium stores computer software instructions used to execute functions of the first aspect and any design of the first aspect or functions of the second aspect and any design of the second aspect, or includes programs involved when performing the method of the first aspect or any design of the first aspect or the method of the second aspect or any design of the second aspect.

In an eighth aspect, a computer program product is provided, where the program product, when invoked and executed by a computer, may cause the computer to perform the method of the first aspect or any design of the first aspect or the method of the second aspect or any design of the second aspect.

In an embodiment of the present application, when the uplink mapping relationship between the QoS stream corresponding to the uplink data received by the first base station and the DRB is not established and the GTP channel corresponding to the QoS stream is established on the second base station, the first base station establishes a forwarding channel according to the address information, transmits the uplink data borne on the default DRB to the second base station, and then uploads computer storage medium to the core network through the GTP channel on the second base station, and solving the problem in the related art that the first base station cannot transmit the uplink data to the core network, where the uplink data needs to be borne by the default DRB and the GPT channel corresponding to the uplink data is established on the node where the non-default DRB is located, and improving the success rate of data transmission to the core network device.

DETAILED DESCRIPTION

Figure 1:
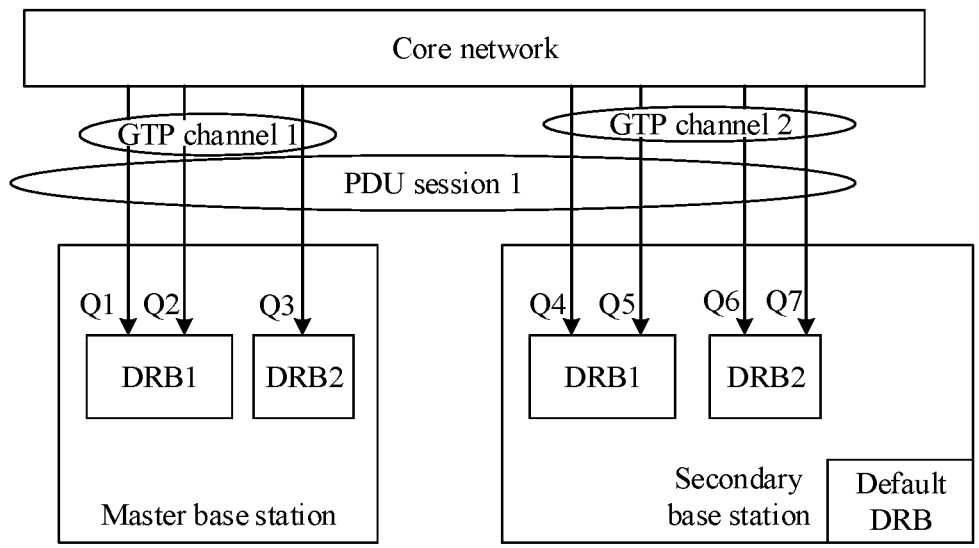
FIG. 1 is a schematic diagram of PDU session separation under dual connectivity in the related art.

Embodiments of the present application will be further described below in details with reference to the accompanying drawings.

The embodiments described herein may be used in the fifth-generation mobile communication technology (5G) system, and may also be used in the next-generation mobile communication system.

In the following, some terms in embodiments of the present application are explained to facilitate the understanding.

(1) The master base station and secondary base station may, for example, include a base station (for example, an access point), and may refer to a device that communicates with a wireless terminal device through one or more cells on an air interface in an access network. The base station may be used to perform inter-conversion between received air interface frame and an IP packet, and used as a router between the terminal device and the rest of the access network, where the rest of the access network may include an IP network. The base station may further coordinate the attribute management of the air interface. For example, the base station may include the evolutional Node B (NodeB or eNB or e-NodeB) in the LTE system or LTE-Advanced (LTE-A) system, or may include the next generation node B (gNB) in the 5G system, which is not limited in embodiments of the present application.

(2) The terminal device, including a device for providing the voice and/or data connectivity to users, for example, may include a handheld device with the wireless connection function, or a processing device connected to a wireless modem. The terminal device may communicate with the core network via the Radio Access Network (RAN), and exchange the voice and/or data with the RAN. The terminal device may include a User Equipment (UE), a wireless terminal device, a mobile terminal device, a subscriber device, a subscriber station, a mobile station, a mobile, a remote station, an Access Point (AP), a remote terminal, an access terminal, a user terminal, a user agent, or a user device, etc. For example, the terminal device may include a mobile phone (or called "cellular" phone); a computer with a mobile terminal device; a portable, pocket, handheld, computer built-in or vehicle-carried mobile device; a smart wearable device or the like, e.g., a Personal Communication Service (PCS) telephone, a cordless telephone, a Session Initiation Protocol (SIP) telephone, a Wireless Local Loop (WLL) station, a Personal Digital Assistant (PDA), a smart watch, a smart helmet, smart glasses, a smart bracelet, and other devices. The terminal device also includes a limited device, e.g., a device with lower power consumption, a device with limited storage capability, or a device with limited computing capability or the like, e.g., includes a bar code or Radio Frequency Identification (RFID) sensor, a Global Positioning System (GPS), a laser scanner and other information sensing devices.

(3) The core network device may be a network element of the Next Generation Network (NGC), or a 5G Core Network (5G-CN) device, or another core network device, where network elements of the NGC may include, for example, Control Plane (CP) network elements and User Plane (UP) network elements. The present application does not limit the core network device. Any core network device that may perform the method described in embodiments of the present application falls into the protection scope of the present application. Furthermore, in the present application, the "core network device" is sometimes referred to as "core network" for short.

(4) PDU session: a PDU session may include one or more QoS streams. The QoS streams included in a PDU session may be mapped to DRBs, and the uplink mapping relationship and the downlink mapping relationship between QoS streams and DRBs may be consistent or inconsistent. In the case of inconsistency, the uplink mapping relationship between QoS streams and DRBs may be configured by the Radio Access Network (RAN) for the terminal device through the control-plane Radio Resource Control (RRC) explicit signaling. In the case of consistency, based on the Reflective QoS mechanism, the terminal device may obtain the uplink mapping relationship according to the downlink mapping relationship during downlink data communication.

The uplink mapping relationship between QoS streams and DRBs can be represented by QoS IDs and DRB identifications (IDs), where the DRB IDs are used to identify the DRBs. In an implementation process, after establishing the uplink mapping relationship between QoS streams and DRBs, the base station saves the uplink mapping relationship between QoS streams and DRBs, and notifies the terminal device of the established DRBs and the uplink mapping relationship between QoS streams and DRBs.

(5) The terms "system" and "network" in embodiments of the present application may be used interchangeably. "A plurality of" refers to two or more than two. In view of this, "a plurality of" may also be understood as "at least two" in embodiments of the present application. "And/or" describes the association relationship of the associated objects, and indicates that there may be three relationships, for example, A and/or B may represent: only A, both A and B, and only B. Furthermore, the character "/" generally indicates that the associated objects have a kind of "or" relationship, unless otherwise specified.

Figure 2:
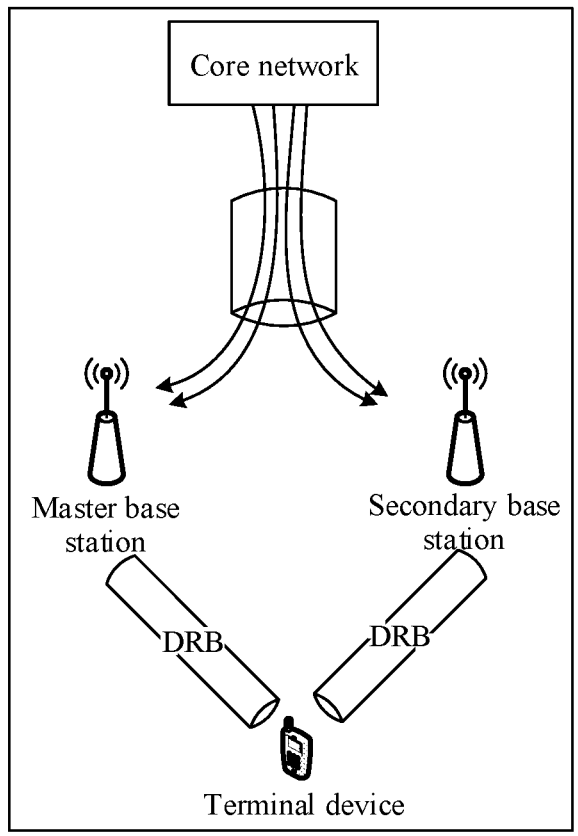
FIG. 2 is a schematic diagram of an application scenario provided by the present application.

Referring to FIG. 2, an application scenario of an embodiment of the present application is illustrated. A terminal device, a master base station, a secondary base station and a core network is included in FIG. 2, where the core network communicates with the master base station and the secondary base station respectively through PDU sessions, and a PDU session may include QoS streams.

The embodiments of the present application will be introduced with reference to the accompanying drawings. In the following introduction process, the embodiment of the present application is applied in the application scenario shown in FIG. 2 as an example.

Figure 3:
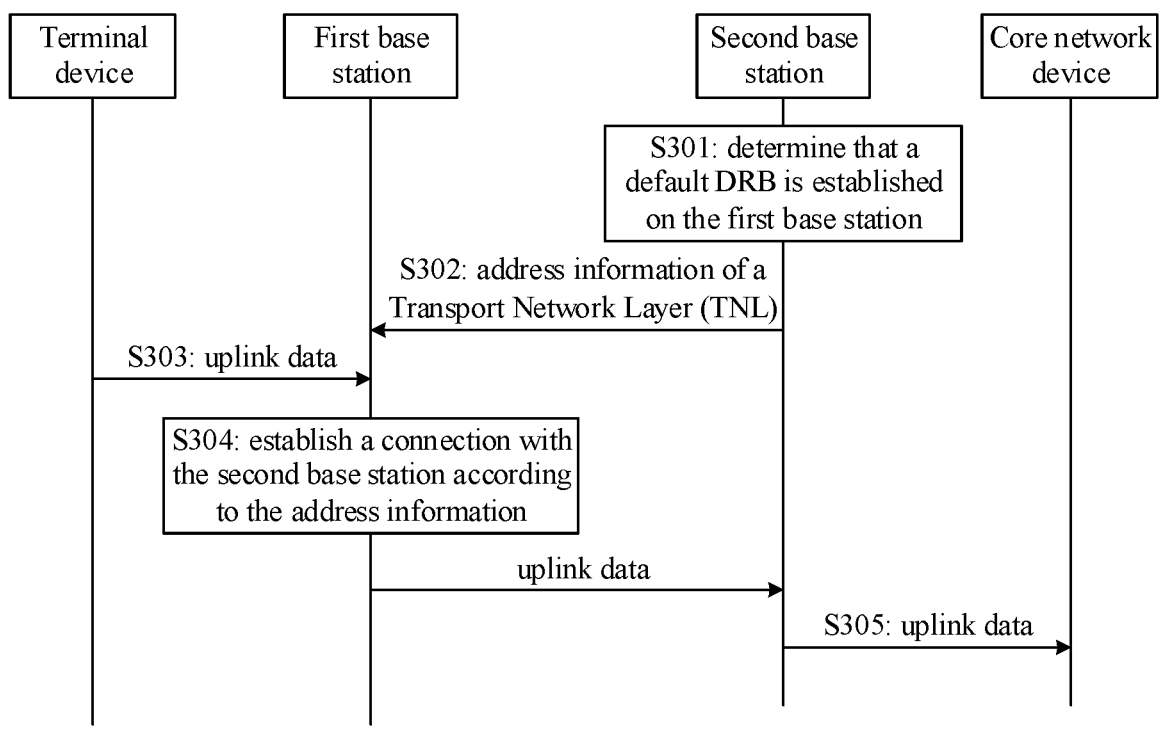
FIG. 3 is a schematic flowchart of a data communication method provided by the present application.

Referring to FIG. 3, an embodiment of the present application provides a data communication method. The process of this method is roughly described as follows.

S301: a second base station determines that a default DRB is established on a first base station.

In an embodiment of the present application, the second base station may determine that the default DRB is established on the first base station by itself, or may determine that the default DRB is established on the first base station according to an instruction of the first base station.

The "default DRB" may also be referred to as the "acquiescent DRB".

S302: the first base station receives address information of a Transport Network Layer (TNL) sent by the second base station.

In an embodiment of the present application, the address information received by the first base station from the second base station is for the preparation of establishing a connection between the first base station and the second base station. The first base station communicates with the second base station through the Xn interface. The protocol stack of the Xn air interface includes two layers: Access Stratum (AS) and Transport Network Layer (TNL), where the TNL layer includes: an Internet Protocol (IP), a Stream Control Transmission Protocol (SCTP), and a Use Datagram Protocol (UDP).

In an embodiment of the present application, the address information of the TNL may be SCTP coupling information and/or user plane transmission address information. The SCTP coupling information may be a transmission address list of the control plane of the second base station and include transmission address information of at least one control plane of the second base station, where the control plane transmission address information may be an IP address of the control plane of the second base station, or a port address of the SCTP of the second base station, or a combination thereof. The user plane transmission address information may be an IP address of the user plane of the second base station, or a port address of the user plane, or a combination of thereof. In one embodiments, the control plane transmission address and the user plane transmission address of the second base station may be identical or different.

In an embodiment of the present application, the second base station sends the address information of the TNL to the first base station when determining that the default DRB is established on the first base station.

S303: the first base station receives uplink data sent by a terminal device, where the uplink data corresponds to a QoS stream.

The first base station receives the uplink data after receiving the address information of the TNL sent by the second base station.

S304: the first base station establishes a connection with the second base station according to the address information when the uplink data needs to be borne by a default DRB of the first base station and a General packet radio service Tunneling Protocol (GTP) channel corresponding to the QoS stream is established on the second base station, to transmit the uplink data borne on the default DRB to the second base station.

In an embodiment of the present application, the uplink data needs to be borne by the default DRB of the first base station, that is, the uplink mapping relationship between the QoS stream of the uplink data and the DRB is not established.

When the uplink data needs to be borne by the default DRB of the first base station and the GTP channel corresponding to the QoS stream is established on the second base station, the first base station establishes a connection with the second base station according to the address information, to transmit the uplink data to the second base station. In one embodiment, the channel through which the first base station establishes a connection with the second base station according to the address information may be referred to as "forwarding channel" or a channel with other name.

In an embodiment of the present application, the first base station may use a predetermined encapsulation protocol to encapsulate the uplink data borne on the default DRB to obtain the encapsulated uplink data, where the predetermined encapsulation protocol may be Generic Routing Encapsulation (GRE) protocol, Point to Point Tunneling Protocol (PPTP), or Layer 2 Forwarding Protocol (L2FP), or other tunneling encapsulation protocol.

S305: the second base station transmits the uplink data borne on the default DRB to a core network device through the GTP channel.

After receiving the encapsulated uplink data, the second base station firstly decapsulates the encapsulated uplink data to obtain the uplink data, and then encapsulates the uplink data through the GTP to transmit the uplink data to the core network device through the GTP channel. In one embodiment, the first base station cannot transmit the uplink data to the core network, where the uplink data needs to be borne by the default DRB and the GPT channel corresponding to the uplink data is established on the node where the non-default DRB is located, and improving the success rate of data transmission to the core network device.

In an embodiment of the present application, the first base station may be a master base station, and the second base station is a secondary base station; or the first base station may be a secondary base station, and the second base station is a master base station.

The data communication solution provided by the present application may be applied to a variety of application scenarios, such as a scenario where a dual connection is to be established or a scenario where a dual connection has been established. Here, in the scenario where a dual connection has been established, it is also possible to distinguish whether the master base station initiates a secondary base station modification process to modify the establishment position of the default DRB or the secondary base station initiates a secondary base station modification process to modify the establishment position of the default DRB. The detailed introduction will be given below by cases. In the following introduction process, for example, the first base station is the master base station and the second base station is the secondary base station.

1. In a scenario where a dual connection is to be established, the default DRB is to be established on the secondary base station.

Figure 4:
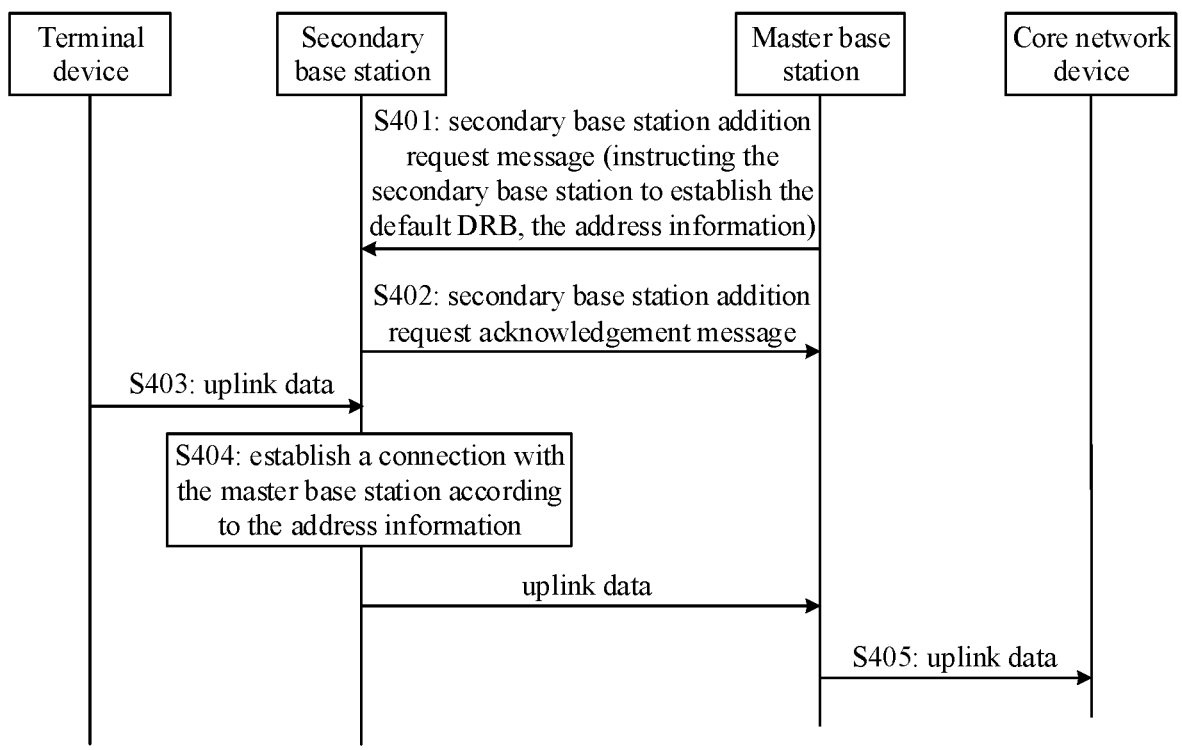
FIG. 4 is a schematic flowchart of a data communication method provided by the present application.

Referring to FIG. 4, the process of this method is roughly described as follows.

S401: the master base station sends a secondary base station addition request message to the secondary base station, where the secondary base station addition request message carries indication information for instructing the secondary base station to establish the default DRB and the address information.

The master base station decides to establish the dual connection according to the management rules and determines to establish the default DRB on the secondary base station, and then sends the secondary base station addition request message to the secondary base station to request the secondary base station to join to establish the dual connection. The secondary base station addition request message also carries the indication information for instructing the secondary base station to establish the default DRB, and the address information.

S402: the secondary base station sends a secondary base station addition request acknowledgement message to the master base station.

The secondary base station establishes the default DRB while sending the secondary base station addition request acknowledgement message to the master base station, and saves the address information in preparation for establishing a connection between the secondary base station and the master base station.

S403: the secondary base station receives uplink data sent by a terminal device, where the uplink data corresponds to a QoS stream.

S404: the secondary base station establishes a connection with the master base station according to the address information when the uplink data needs to be borne by the default DRB of the secondary base station and the GTP channel corresponding to the QoS stream is established on the master base station, to transmit the uplink data borne on the default DRB to the master base station.

S405: the master base station transmits the uplink data to the core network device through the GTP channel.

2. In a scenario where a dual connection is to be established, the default DRB is to be established on the master base station.

Figure 5:
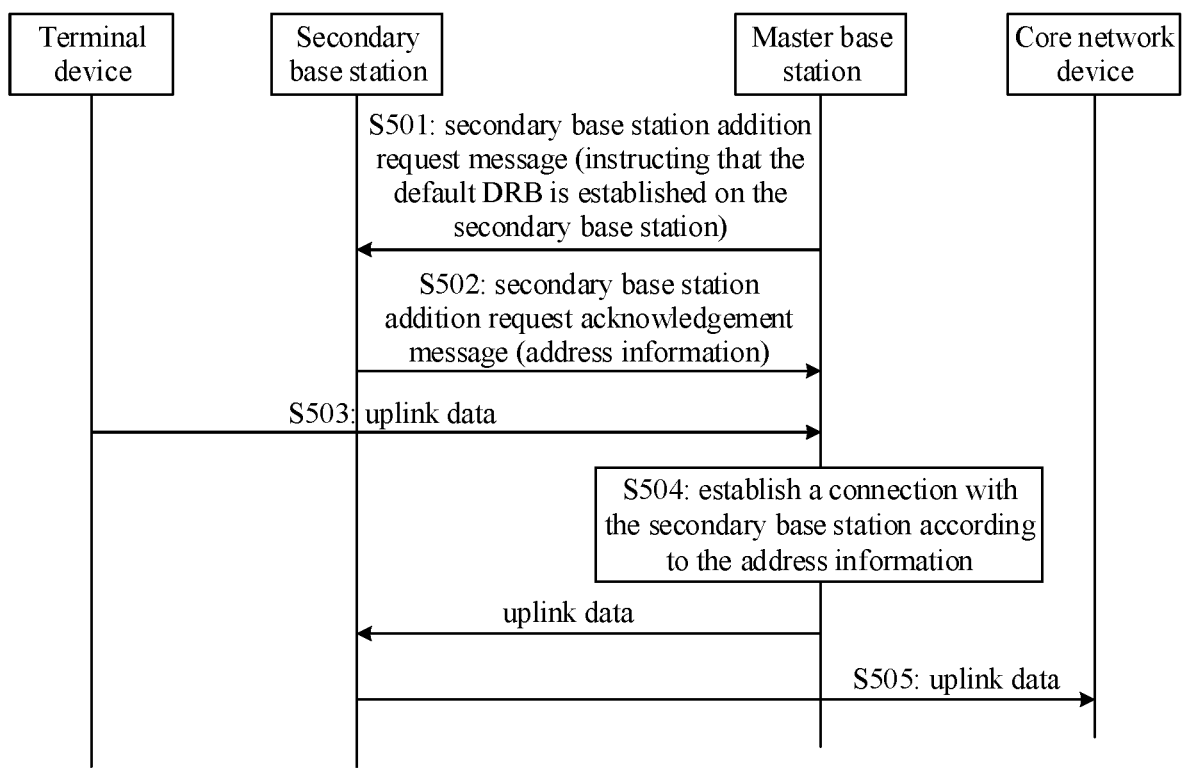
FIG. 5 is a schematic flowchart of a data communication method provided by the present application.

Referring to FIG. 5, the process of this method is roughly described as follows.

S501: the master base station sends a secondary base station addition request message to the secondary base station, where the secondary base station addition request message carries indication information for indicating that the default DRB is established on the master base station.

The master base station decides to establish the dual connection according to the management rules and determines to establish the default DRB on the master base station, and then sends the secondary base station addition request message to the secondary base station to request the secondary base station to join to establish the dual connection. The secondary base station addition request message also carries the indication information for indicating that the default DRB is established on the master base station.

Of course, in an embodiment of the present application, the secondary base station addition request message may not carry the indication information for indicating that the default DRB is established on the master base station. Then, when the secondary base station addition request message doses not carry the indication information for indicating that the default DRB is established on the master base station, the default DRB is established on the master base station by default.

When the master base station determines that the default DRB is to be established on the master base station, the master base station establishes the default DRB.

S502: the secondary base station sends a secondary base station addition request acknowledgement message to the master base station, where the secondary base station addition request acknowledgement message carries address information.

S503: the master base station receives uplink data sent by a terminal device, where the uplink data corresponds to a QoS stream.

S504: the master base station establishes a connection with the secondary base station according to the address information when the uplink data needs to be borne by the default DRB of the master base station and the GTP channel corresponding to the QoS stream is established on the secondary base station, to transmit the uplink data borne on the default DRB to the secondary base station.

S505: the secondary base station transmits the uplink data to the core network device through the GTP channel.

3. In a scenario where a dual connection has been established, the master base station initiates a secondary base station modification process and determines to establish the default DRB on the secondary base station.

Figure 6:
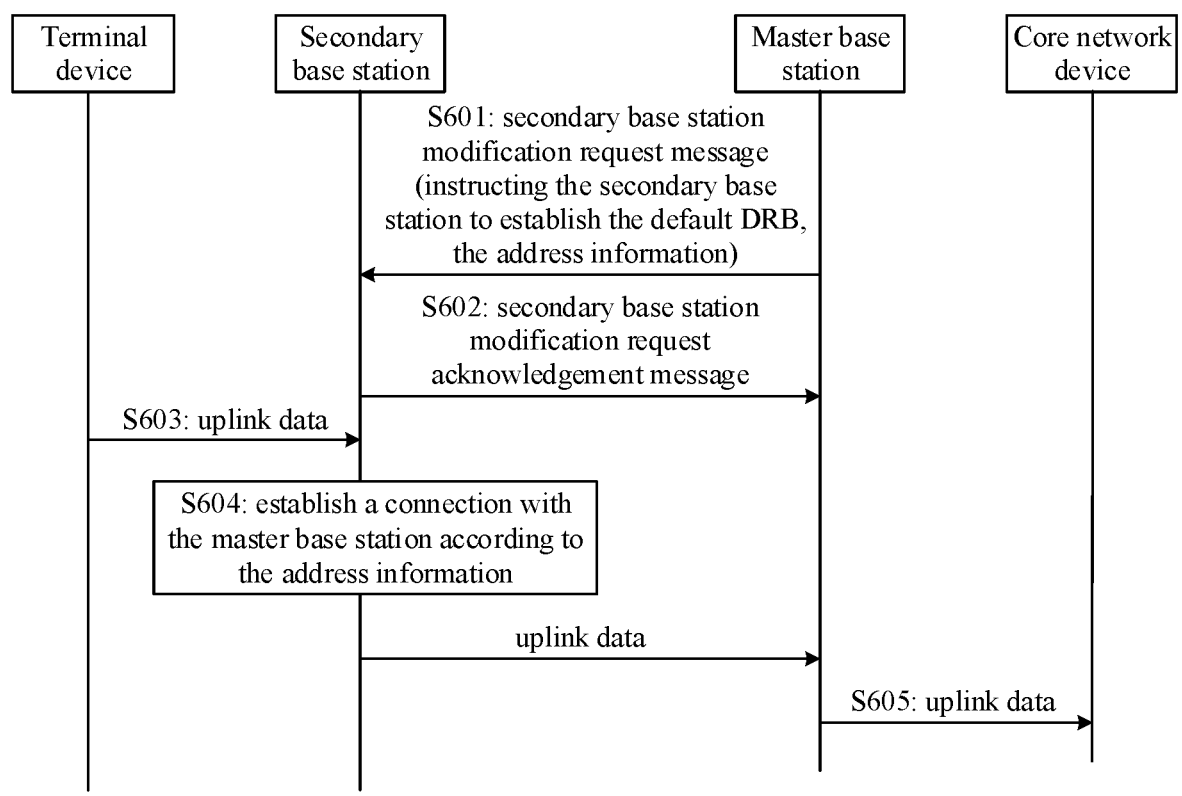
FIG. 6 is a schematic flowchart of a data communication method provided by the present application.

Referring to FIG. 6, the process of this method is roughly described as follows.

S601: the master base station sends a secondary base station modification request message to the secondary base station, where the secondary base station modification request message carries indication information for instructing the secondary base station to establish the default DRB and the address information.

After establishment of the dual connection is completed, the master base station may initiate a secondary base station modification process to modify the establishment position of the default DRB. When determining to establish the default DRB on the secondary base station, the master base station sends a modification request message to the secondary base station, where the modification request message carries the indication information for instructing the secondary base station to establish the default DRB, to request to modify the establishment position of the default DRB and establish the default DRB on the secondary base station. The modification request message also carries the address information.

S602: the secondary base station sends a secondary base station modification request acknowledgement message to the master base station.

In an embodiment of the present application, the secondary base station establishes the default DRB while sending the secondary base station modification request acknowledgement message to the master base station, and saves the address information in preparation for establishing a connection between the secondary base station and the master base station.

S603: the secondary base station receives uplink data sent by a terminal device, where the uplink data corresponds to a QoS stream.

S604: the secondary base station establishes a connection with the master base station according to the address information when the uplink data needs to be borne by the default DRB of the secondary base station and the GTP channel corresponding to the QoS stream is established on the master base station, to transmit the uplink data borne on the default DRB to the master base station.

S605: the master base station transmits the uplink data to the core network device through the GTP channel.

4. In a scenario where a dual connection has been established, the master base station initiates a secondary base station modification process and determines to establish the default DRB on the master base station.

Figure 7:
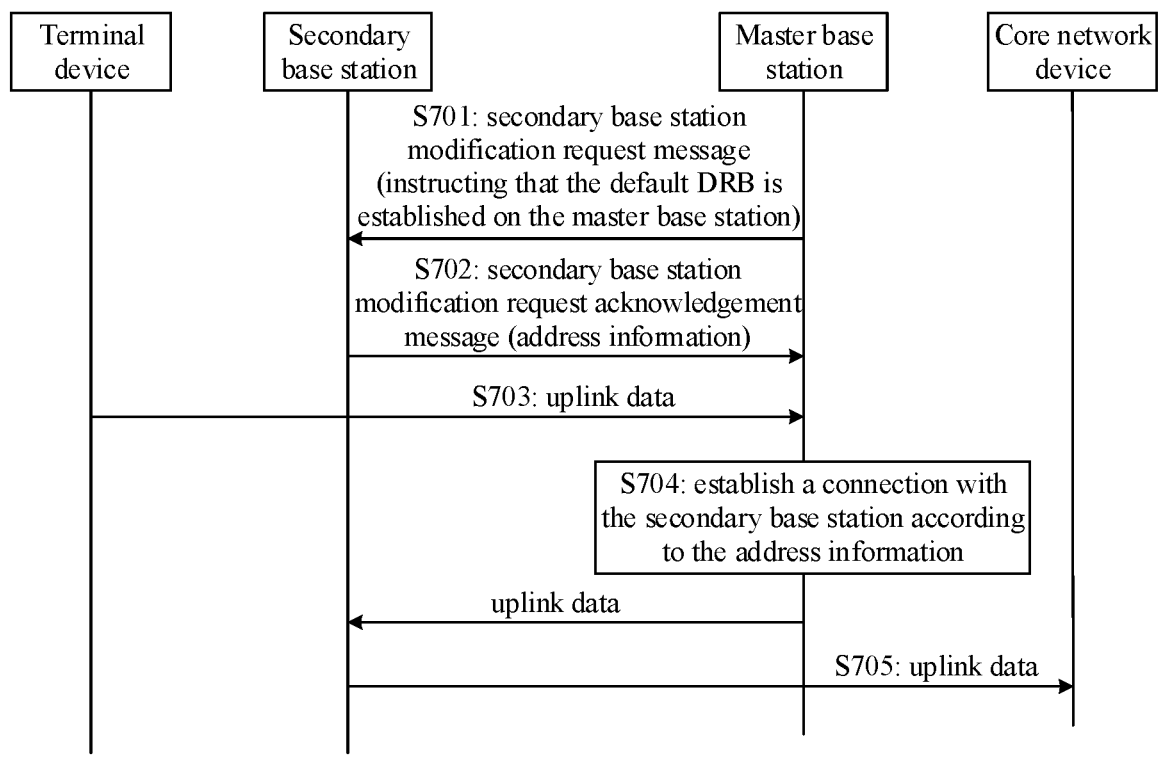
FIG. 7 is a schematic flowchart of a data communication method provided by the present application.

Referring to FIG. 7, the process of this method is roughly described as follows.

S701: the master base station sends a secondary base station modification request message to the secondary base station, where the secondary base station modification request message carries indication information for indicating that the default DRB is established on the master base station.

After establishment of the dual connection is completed, the master base station may initiate a secondary base station modification process to modify the establishment position of the default DRB. When determining to establish the default DRB on the master base station, the master base station sends a modification request message to the secondary base station, where the modification request message carries the indication information for indicating that the default DRB is established on the master base station, to request to modify the establishment position of the default DRB and establish the default DRB on the master base station.

S702: the secondary base station sends a secondary base station modification request acknowledgement message to the master base station, where the secondary base station modification request acknowledgement message carries address information.

S703: the master base station receives uplink data sent by a terminal device, where the uplink data corresponds to a QoS stream.

S704: the master base station establishes a connection with the secondary base station according to the address information when the uplink data needs to be borne by the default DRB of the master base station and the GTP channel corresponding to the QoS stream is established on the secondary base station, to transmit the uplink data borne on the default DRB to the secondary base station.

S705: the secondary base station transmits the uplink data to the core network device through the GTP channel.

5. In a scenario where a dual connection has been established, the secondary base station initiates a secondary base station modification process and determines to establish the default DRB on the secondary base station.

Figure 8:
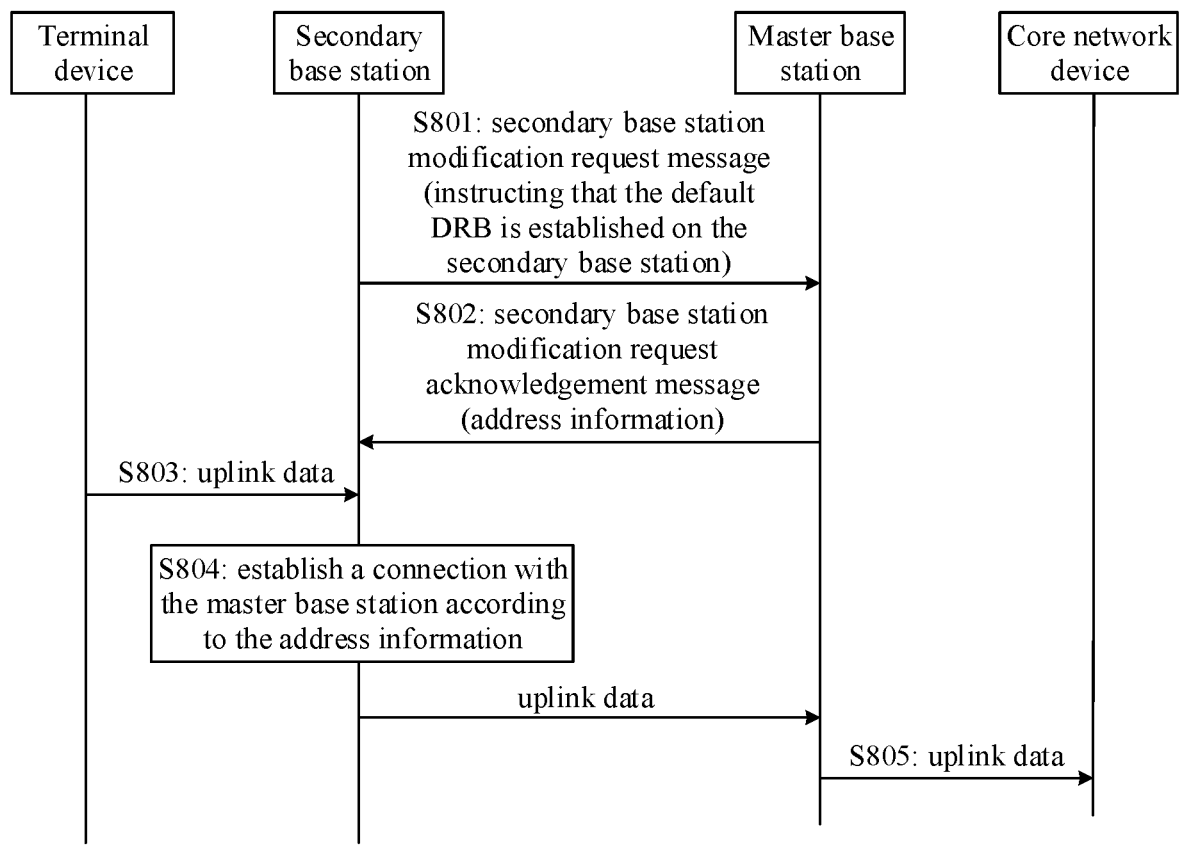
FIG. 8 is a schematic flowchart of a data communication method provided by the present application.

Referring to FIG. 8, the process of this method is roughly described as follows.

S801: the secondary base station sends a secondary base station modification request message to the master base station, where the secondary base station modification request message carries indication information for indicating that the default DRB is established on the secondary base station.

After establishment of the dual connection is completed, the secondary base station modifies the default DRB to be established on the secondary base station according to the management rules, and then sends a secondary base station modification request message to the master base station, where the secondary base station modification request message carries the indication information for indicating that the default DRB is established on the secondary base station.

S802: the master base station sends a secondary base station modification request acknowledgement message to the secondary base station, where the secondary base station modification request acknowledgement message carries address information.

S803: the secondary base station receives uplink data sent by a terminal device, where the uplink data corresponds to a QoS stream.

S804: the secondary base station establishes a connection with the master base station according to the address information when the uplink data needs to be borne by the default DRB of the secondary base station and the GTP channel corresponding to the QoS stream is established on the master base station, to transmit the uplink data borne on the default DRB to the master base station.

S805: the master base station transmits the uplink data to the core network device through the GTP channel.

6. In a scenario where a dual connection has been established, the secondary base station initiates a secondary base station modification process and determines to establish the default DRB on the master base station.

Figure 9:
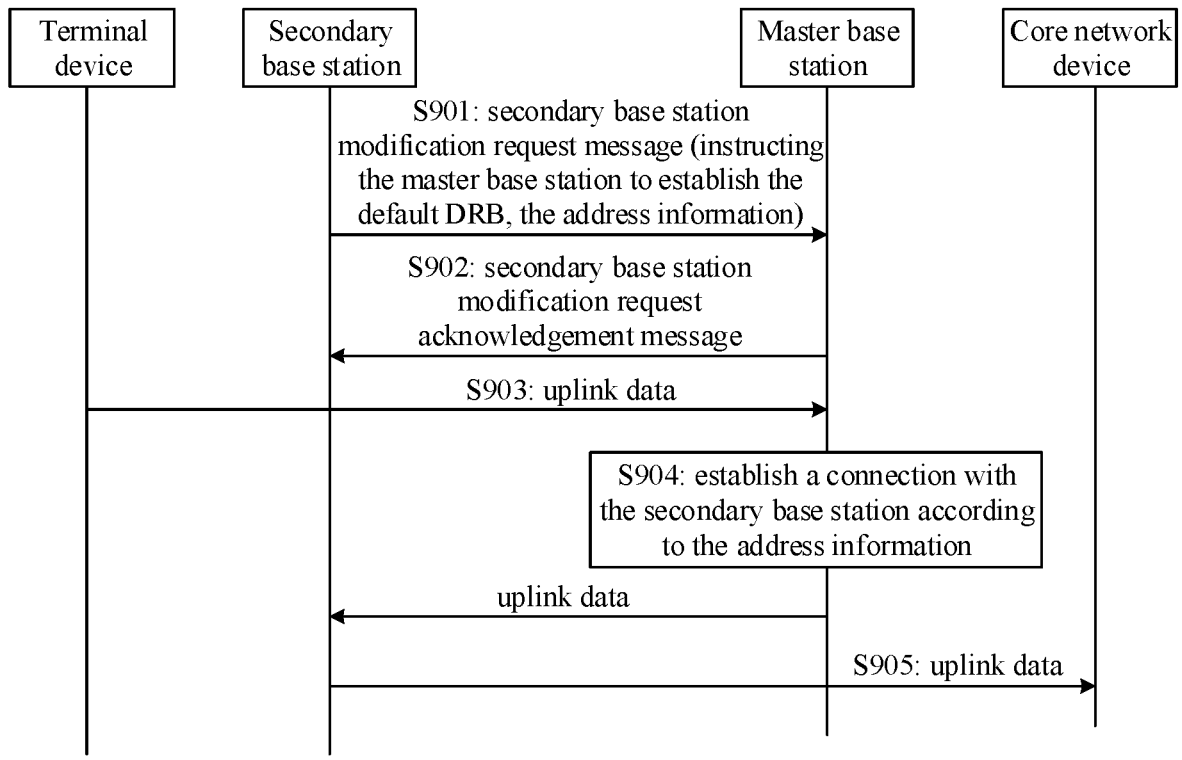
FIG. 9 is a schematic flowchart of a data communication method provided by the present application.

Referring to FIG. 9, the process of this method is roughly described as follows.

S901: the secondary base station sends a secondary base station modification request message to the master base station, where the secondary base station modification request message carries indication information for instructing the master base station to establish the default DRB and the address information.

The secondary base station decides to modify the default DRB to be established on the master base station according to the management rules, and then sends a secondary base station modification request message to the secondary base station, where the secondary base station modification request message carries the indication information for instructing the master base station to establish the default DRB and the address information.

S902: the master base station sends a secondary base station modification request acknowledgement message to the secondary base station.

S903: the master base station receives uplink data sent by a terminal device, where the uplink data corresponds to a QoS stream.

S904: the master base station establishes a connection with the secondary base station according to the address information when the uplink data needs to be borne by the default DRB of the master base station and the GTP channel corresponding to the QoS stream is established on the secondary base station, to transmit the uplink data borne on the default DRB to the secondary base station.

S905: the secondary base station transmits the uplink data to the core network device through the GTP channel.

The apparatuses provided by embodiments of the present application will be introduced below with reference to the drawings.

Figure 10:
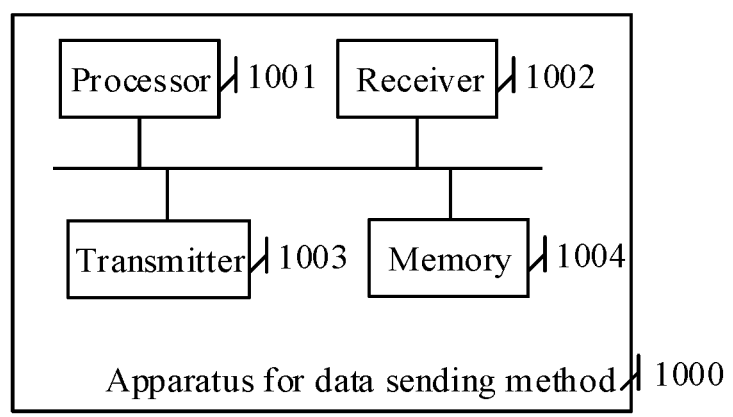
FIG. 10 is a structural schematic diagram of an apparatus for data communication method provided by the present application.

Referring to FIG. 10, based on the same inventive concept, an embodiment of the present application provides an apparatus 1000 for data communication method. In an embodiment, the apparatus includes a processor 1001, a receiver 1002, a transmitter 1003 and a memory 1004. The receiver 1002, transmitter 1003 and memory 1004 are coupled to the processor 1001. The processor 1001 may be a Central Processing Unit (CPU) or an Application-Specific Integrated Circuit (ASIC), or may be one or more integrated circuits for controlling the program execution, or may be a baseband chip, etc. There may be one or more memories, and the memory may be a Read Only Memory (ROM), a Random Access Memory (RAM) or a magnetic disk memory, etc.

By designing and programming the processor 1001, the codes corresponding to the above-mentioned data communication method may be solidified into a chip so that the chip may perform the following steps during operation: controlling the receiver 1002 to receive address information of a Transport Network Layer (TNL) sent by a second base station and uplink data sent by a terminal device, where the uplink data corresponds to a Quality of Service (QoS) stream; establishing a connection with the second base station according to the address information when the uplink data needs to be borne by a default Data Radio Bearer (DRB) of the apparatus and a General packet radio service Tunneling Protocol (GTP) channel corresponding to the QoS stream is established on the second base station, to transmit the uplink data borne on the default DRB to the second base station and then transmit the uplink data to a core network device through the GTP channel.

In a possible design, the apparatus is a secondary base station, and the second base station is a master base station.

In a possible design, when controlling the receiver to receive the address information of the TNL sent by the second base station, the processor 1001 is configured to: control the receiver 1002 to receive a secondary base station addition request message sent by the master base station, where the secondary base station addition request message carries indication information for instructing the apparatus to establish the default DRB and the address information; or control the receiver 1002 to receive a secondary base station modification request message sent by the master base station, where the secondary base station modification request message carries the indication information for instructing the apparatus to establish the default DRB and the address information; correspondingly, the processor 1001 is further configured to: establish the default DRB according to the indication information.

In a possible design, the apparatus further includes: a transmitter 1003 configured to send a secondary base station modification request message to the master base station, where the secondary base station modification request message carries indication information for indicating that the default DRB is established on the apparatus; correspondingly, when controlling the receiver 1002 to receive the address information of the TNL sent by the second base station, the processor 1001 is configured to: control the receiver 1002 to receive a secondary base station modification request acknowledgement message sent by the master base station, where the secondary base station modification request acknowledgement message carries the address information.

In a possible design, the apparatus is a master base station, and the second base station is a secondary base station.

In a possible design, the apparatus further includes: a transmitter 1003 configured to send a secondary base station addition request message to the secondary base station, where the secondary base station addition request message carries indication information for indicating that the default DRB is established on the apparatus; correspondingly, when controlling the receiver 1002 to receive the address information of the TNL sent by the second base station, the processor 1001 is configured to: control the receiver 1002 to receive a secondary base station addition request acknowledgement message sent by the secondary base station, where the secondary base station addition request acknowledgement message carries the address information.

In a possible design, the apparatus further includes: a transmitter 1003 configured to send a secondary base station modification request message to the secondary base station, where the secondary base station modification request message carries indication information for indicating that the default DRB is established on the apparatus; correspondingly, when controlling the receiver 1002 to receive the address information of the TNL sent by the second base station, the processor 1001 is configured to: control the receiver 1002 to receive a secondary base station modification request acknowledgement message sent by the secondary base station, where the secondary base station modification request acknowledgement message carries the address information.

In a possible design, when controlling the receiver 1002 to receive the address information of the TNL sent by the second base station, the processor 1001 is configured to: control the receiver 1002 to receive a secondary base station modification request message sent by the secondary base station, where the secondary base station modification request message carries indication information for instructing the apparatus to establish the default DRB and the address information; correspondingly, the processor 1001 is further configured to: establish the default DRB according to the indication information.

Figure 11:
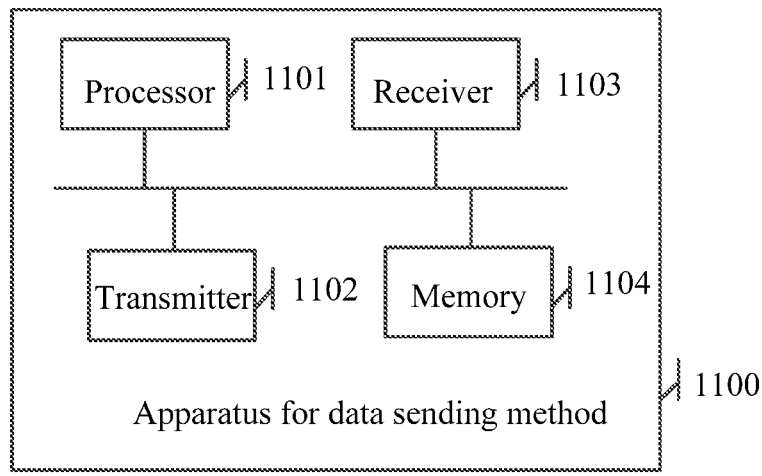
FIG. 11 is a structural schematic diagram of another apparatus for data communication method provided by the present application.

Referring to FIG. 11, based on the same inventive concept, an embodiment of the present application provides an apparatus 1100 for data communication method. In an embodiment, the apparatus includes a processor 1101, a transmitter 1102, a receiver 1103 and a memory 1104. The transmitter 1102, receiver 1103 and memory 1104 are coupled to the processor 1101. The processor 1101 may be a Central Processing Unit (CPU) or an Application-Specific Integrated Circuit (ASIC), or may be one or more integrated circuits for controlling the program execution, or may be a baseband chip, etc. There may be one or more memories, and the memory may be a Read Only Memory (ROM), a Random Access Memory (RAM) or a magnetic disk memory, etc.

By designing and programming the processor 1101, the codes corresponding to the above-mentioned data communication method may be solidified into a chip so that the chip may perform the following steps during operation: determining that a default Data Radio Bearer (DRB) is established on a first base station; controlling the transmitter 1102 to send the address information of a Transport Network Layer (TNL) to the first base station to establish a connection with the first base station according to the address information when uplink data sent by a terminal device and received by the first base station needs to be borne by the default DRB and a General packet radio service Tunneling Protocol (GTP) channel corresponding to a Quality of Service (QoS) stream of the uplink data is established on the apparatus, to transmit the uplink data borne on the default DRB to the apparatus and then transmit the uplink data to a core network device through the GTP channel.

In a possible design, the first base station is a secondary base station, and the apparatus is a master base station.

In a possible design, when controlling the transmitter 1102 to send the address information of the TNL to the first base station, the processor 1101 is configured to: control the transmitter 1102 to send a secondary base station addition request message to the secondary base station, where the secondary base station addition request message carries indication information for instructing the secondary base station to establish the default DRB and the address information; or control the transmitter 1102 to send a secondary base station modification request message to the secondary base station, where the secondary base station modification request message carries the indication information for instructing the secondary base station to establish the default DRB and the address information.

In a possible design, the apparatus further includes: a receiver 1103 configured to receive a secondary base station modification request message sent by the secondary base station, where the secondary base station modification request message carries indication information for indicating that the default DRB is established on the secondary base station; correspondingly, when controlling the transmitter 1102 to send the address information of the TNL to the first base station, the processor 1101 is configured to: control the transmitter 1102 to send a secondary base station modification request acknowledgement message to the secondary base station, where the secondary base station modification request acknowledgement message carries the address information.

In a possible design, the first base station is a master base station, and the apparatus is a secondary base station.

In a possible design, the apparatus further includes: a receiver 1103 configured to receive a secondary base station addition request message sent by the master base station, where the secondary base station addition request message carries indication information for indicating that the default DRB is established on the master base station; correspondingly, when controlling the transmitter 1102 to send the address information of the TNL to the first base station, the processor 1101 is configured to: control the transmitter 1102 to send a secondary base station addition request acknowledgement message to the master base station, where the secondary base station addition request acknowledgement message carries the address information.

In a possible design, the apparatus further includes: a receiver 1103 configured to receive a secondary base station modification request message sent by the master base station, where the secondary base station modification request message carries indication information for indicating that the default DRB is established on the master base station; correspondingly, when controlling the transmitter 1102 to send the address information of the TNL to the first base station, the processor 1101 is configured to: control the transmitter 1102 to send a secondary base station modification request acknowledgement message to the master base station, where the secondary base station modification request acknowledgement message carries the address information.

In a possible design, when controlling the transmitter 1102 to send the address information of the TNL to the first base station, the processor 1101 is configured to: control the transmitter 1102 to send a secondary base station modification request message to the master base station, where the secondary base station modification request message carries indication information for instructing the master base station to establish the default DRB and the address information.

Figure 12:
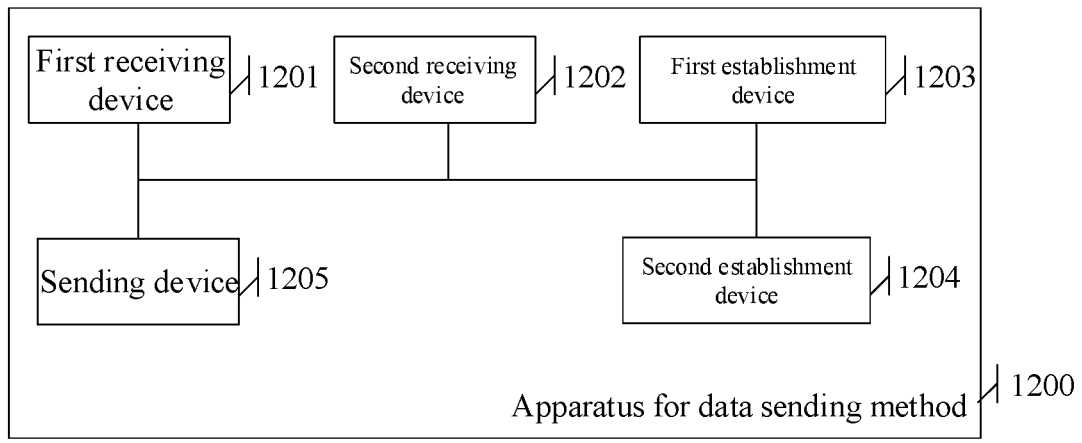
FIG. 12 is a structural schematic diagram of another apparatus for data communication method provided by the present application.

Referring to FIG. 12, based on the same inventive concept, an embodiment of the present application provides an apparatus 1200 for data communication method, including: a first receiving device 1201 configured to receive address information of a Transport Network Layer (TNL) sent by a second base station; a second receiving device 1202 configured to receive uplink data sent by a terminal device, where the uplink data corresponds to a Quality of Service (QoS) stream; a first establishment device 1203 configured to establish a connection with the second base station according to the address information when the uplink data needs to be borne by a default Data Radio Bearer (DRB) of the apparatus and a General packet radio service Tunneling Protocol (GTP) channel corresponding to the QoS stream is established on the second base station, to transmit the uplink data borne on the default DRB to the second base station and then transmit the uplink data to a core network device through the GTP channel.

In a possible design, the apparatus is a secondary base station, and the second base station is a master base station.

In a possible design, when receiving the address information of the TNL sent by the second base station, the first receiving device 1201 is configured to: receive a secondary base station addition request message sent by the master base station, where the secondary base station addition request message carries indication information for instructing the secondary base station to establish the default DRB and the address information; or receive a secondary base station modification request message sent by the master base station, where the secondary base station modification request message carries indication information for instructing the secondary base station to establish the default DRB and the address information; correspondingly, the apparatus further includes: a second establishment device 1204 configured to establish the default DRB according to the indication information.

In a possible design, the apparatus further includes: a sending device 1205 configured to send a secondary base station modification request message to the master base station, where the secondary base station modification request message carries indication information for indicating that the default DRB is established on the secondary base station; correspondingly, when receiving the address information of the TNL sent by the second base station, the first receiving device 1201 is configured to: receive a secondary base station modification request acknowledgement message sent by the master base station, where the secondary base station modification request acknowledgement message carries the address information.

In a possible design, the apparatus is a master base station, and the second base station is a secondary base station.

In a possible design, the apparatus further includes: a sending device 1205 configured to send a secondary base station addition request message to the secondary base station, where the secondary base station addition request message carries indication information for indicating that the default DRB is established on the master base station; correspondingly, when receiving the address information of the TNL sent by the second base station, the first receiving device 1201 is configured to: receive a secondary base station addition request acknowledgement message sent by the secondary base station, where the secondary base station addition request acknowledgement message carries the address information.

In a possible design, the apparatus further includes: a sending device 1205 configured to send a secondary base station modification request message to the secondary base station, where the secondary base station modification request message carries indication information for indicating that the default DRB is established on the apparatus; correspondingly, when receiving the address information of the TNL sent by the second base station, the first receiving device 1201 is configured to: receive a secondary base station modification request acknowledgement message sent by the secondary base station, where the secondary base station modification request acknowledgement message carries the address information.

In a possible design, when receiving the address information of the TNL sent by the second base station, the first receiving device 1201 is configured to: receive a secondary base station modification request message sent by the secondary base station, where the secondary base station modification request message carries indication information for instructing the apparatus to establish the default DRB and the address information; correspondingly, the apparatus further includes: a second establishment device 1204 configured to establish the default DRB according to the indication information.

Figure 13:
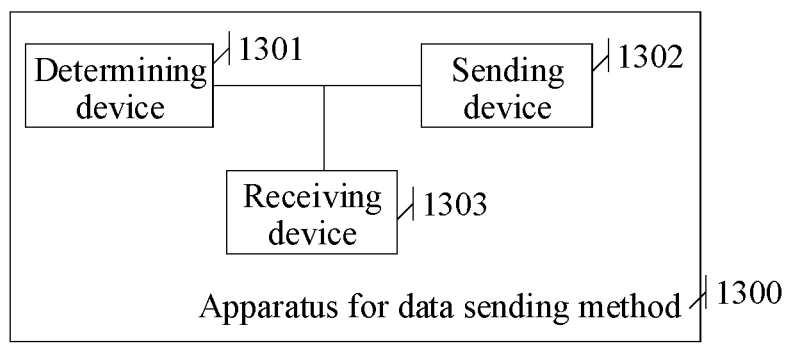
FIG. 13 is a structural schematic diagram of another apparatus for data communication method provided by the present application.

Referring to FIG. 13, based on the same inventive concept, the present application provides an apparatus 1300 for data communication method, including: a determining device 1301 configured to determine that a default Data Radio Bearer (DRB) is established on a first base station; a sending device 1302 configured to send address information of a Transport Network Layer (TNL) to the first base station to establish a connection with the first base station according to the address information when uplink data sent by a terminal device and received by the first base station needs to be borne by the default DRB and a General packet radio service Tunneling Protocol (GTP) channel corresponding to a Quality of Service (QoS) stream of the uplink data is established on the apparatus, to transmit the uplink data borne on the default DRB to the apparatus and then transmit the uplink data to a core network device through the GTP channel.

In a possible design, the first base station is a secondary base station, and the apparatus is a master base station.

In a possible design, when sending the address information of the TNL to the first base station, the sending device 1302 is configured to: send a secondary base station addition request message to the secondary base station, where the secondary base station addition request message carries indication information for instructing the secondary base station to establish the default DRB and the address information; or send a secondary base station modification request message to the secondary base station, where the secondary base station modification request message carries indication information for instructing the secondary base station to establish the default DRB and the address information.

In a possible design, the apparatus further includes: a receiving device 1303 configured to receive a secondary base station modification request message sent by the secondary base station, where the secondary base station modification request message carries indication information for indicating that the default DRB is established on the secondary base station; correspondingly, when sending the address information of the TNL to the first base station, the sending device 1302 is configured to: send a secondary base station modification request acknowledgement message to the secondary base station, where the secondary base station modification request acknowledgement message carries the address information.

In a possible design, the first base station is a master base station, and the apparatus is a secondary base station.

In a possible design, the apparatus further includes: a receiving device 1303 configured to receive a secondary base station addition request message sent by the master base station, where the secondary base station addition request message carries indication information for indicating that the default DRB is established on the master base station; correspondingly, when sending the address information of the TNL to the first base station, the sending device 1302 is configured to: send a secondary base station addition request acknowledgement message to the master base station, where the secondary base station addition request acknowledgement message carries the address information.

In a possible design, the apparatus further includes: a receiving device 1303 configured to receive a secondary base station modification request message sent by the master base station, where the secondary base station modification request message carries indication information for indicating that the default DRB is established on the master base station; correspondingly, when sending the address information of the TNL to the first base station, the sending device 1302 is configured to: send a secondary base station modification request acknowledgement message to the master base station, where the secondary base station modification request acknowledgement message carries the address information.

In a possible design, when sending the address information of the TNL to the first base station, the sending device 1302 is configured to: send a secondary base station modification request message to the master base station, where the secondary base station modification request message carries indication information for instructing the master base station to establish the default DRB and the address information.

An embodiment of the present application further provides a computer storage medium. The storage medium may include a memory that may store a program. When the program is executed, all the steps performed by the apparatuses as recorded in the above method embodiments shown in FIGS. 3-9 are included.

Embodiments of the present application may provide methods, systems and computer program products. Thus the present application may take the form of hardware embodiments alone, software embodiments alone, or embodiments combining the software and hardware aspects. Also the present application may take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the present application. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions may also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions may also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A data communication method, the method comprising:
  receiving, by a first base station, address information of a Transport Network Layer, TNL, sent by a second base station;
  receiving, by the first base station, uplink data sent by a terminal device, wherein the uplink data corresponds to a Quality of Service, QoS, stream;
  establishing, by the first base station, a connection with the second base station according to the address information when the uplink data needs to be borne by a default Data Radio Bearer, DRB, of the first base station and a General packet radio service Tunneling Protocol, GTP, channel corresponding to the QoS stream is established on the second base station, to transmit the uplink data borne on the default DRB to the second base station and then transmit the uplink data to a core network device through the GTP channel;
  wherein the first base station is a secondary base station, and the second base station is a master base station;
    wherein receiving, by the first base station, the address information of the TNL sent by the second base station, comprises:
      receiving, by the secondary base station, a secondary base station addition request message sent by the master base station, wherein the secondary base station addition request message carries indication information for instructing the secondary base station to establish the default DRB and the address information; or
    receiving, by the secondary base station, a secondary base station modification request message sent by the master base station, wherein the secondary base station modification request message carries indication information for instructing the secondary base station to establish the default DRB and the address information;
  correspondingly, the method further comprises:
  establishing, by the secondary base station, the default DRB according to the indication information;
or
wherein the first base station is a secondary base station, and the second base station is a master base station;
  wherein the method further comprises:
    sending, by the secondary base station, a secondary base station modification request message to the master base station, wherein the secondary base station modification request message carries indication information for indicating that the default DRB is established on the secondary base station;
  correspondingly, receiving, by the first base station, the address information of the TNL sent by the second base station, comprises:
    receiving, by the secondary base station, a secondary base station modification request acknowledgement message sent by the master base station, wherein the secondary base station modification request acknowledgement message carries the address information;
or
wherein the first base station is a master base station, and the second base station is a secondary base station;
  wherein the method further comprises:
    sending, by the master base station, a secondary base station addition request message to the secondary base station, wherein the secondary base station addition request message carries indication information for indicating that the default DRB is established on the master base station;
  correspondingly, receiving, by the first base station, the address information of the TNL sent by the second base station, comprises:
    receiving, by the master base station, a secondary base station addition request acknowledgement message sent by the secondary base station, wherein the secondary base station addition request acknowledgement message carries the address information
or
wherein the first base station is a master base station, and the second base station is a secondary base station;
  wherein the method further comprises:
    sending, by the master base station, a secondary base station modification request message to the secondary base station, wherein the secondary base station modification request message carries indication information for indicating that the default DRB is established on the master base station;
  correspondingly, receiving, by the first base station, the address information of the TNL sent by the second base station, comprises:
    receiving, by the master base station, a secondary base station modification request acknowledgement message sent by the secondary base station, wherein the secondary base station modification request acknowledgement message carries the address information;

or wherein the first base station is a master base station, and the second base station is a secondary base station; wherein receiving, by the first base station, the address information of the TNL sent by the second base station, comprises:

receiving, by the master base station, a secondary base station modification request message sent by the secondary base station, wherein the secondary base station modification request message carries indication information for instructing the master base station to establish the default DRB and the address information;

correspondingly, the method further comprises:

establishing, by the master base station, the default DRB according to the indication information.

2. A data communication method, the method comprising:

determining, by a second base station, that a default Data Radio Bearer, DRB, is established on a first base station;

sending, by the second base station, address information of a Transport Network Layer, TNL, to the first base station to establish a connection with the first base station according to the address information when uplink data sent by a terminal device and received by the first base station needs to be borne by the default DRB and a General packet radio service Tunneling Protocol, GTP, channel corresponding to a Quality of Service, QoS, stream of the uplink data is established on the second base station, to transmit the uplink data borne on the default DRB to the second base station and then transmit the uplink data to a core network device through the GTP channel;

wherein the first base station is a secondary base station, and the second base station is a master base station; wherein sending, by the second base station, the address information of the TNL to the first base station, comprises:

sending, by the master base station, a secondary base station addition request message to the secondary base station, wherein the secondary base station addition request message carries indication information for instructing the secondary base station to establish the default DRB and the address information; or sending, by the master base station, a secondary base station modification request message to the secondary base station, wherein the secondary base station modification request message carries indication information for instructing the secondary base station to establish the default DRB and the address information;

or wherein the first base station is a secondary base station, and the second base station is a master base station; wherein the method further comprises:

receiving, by the master base station, a secondary base station modification request message sent by the secondary base station, wherein the secondary base station modification request message carries indication information for indicating that the default DRB is established on the secondary base station;

correspondingly, sending, by the second base station, the address information of the TNL to the first base station, comprises:

sending, by the master base station, a secondary base station modification request acknowledgement message to the secondary base station, wherein the secondary base station modification request acknowledgement message carries the address information;

or wherein the first base station is a master base station, and the second base station is a secondary base station; wherein the method further comprises:

receiving, by the secondary base station, a secondary base station addition request message sent by the master base station, wherein the secondary base station addition request message carries indication information for indicating that the default DRB is established on the master base station;

correspondingly, sending, by the second base station, the address information of the TNL to the first base station, comprises:

sending, by the secondary base station, a secondary base station addition request acknowledgement message to the master base station, wherein the secondary base station addition request acknowledgement message carries the address information;

or wherein the first base station is a master base station, and the second base station is a secondary base station; wherein the method further comprises:

receiving, by the secondary base station, a secondary base station modification request message sent by the master base station, wherein the secondary base station modification request message carries indication information for indicating that the default DRB is established on the master base station;

correspondingly, sending, by the second base station, the address information of the TNL to the first base station, comprises:

sending, by the secondary base station, a secondary base station modification request acknowledgement message to the master base station, wherein the secondary base station modification request acknowledgement message carries the address information:

or wherein the first base station is a master base station, and the second base station is a secondary base station; wherein sending, by the second base station, the address information of the TNL to the first base station, comprises:

sending, by the secondary base station, a secondary base station modification request message to the master base station, wherein the secondary base station modification request message carries indication information for instructing the master base station to establish the default DRB and the address information.

3. A data communication apparatus applied to a first base station, the apparatus comprising:

a memory, configured to store instructions;

a processor, configured to read the instructions stored in the memory to perform:

controlling a receiver to receive address information of a Transport Network Layer, TNL, sent by a second base station and uplink data sent by a terminal device, wherein the uplink data corresponds to a Quality of Service, QoS, stream;

establishing a connection with the second base station according to the address information when the uplink data needs to be borne by a default Data Radio Bearer, DRB, of the apparatus and a General packet radio service Tunneling Protocol, GTP, channel corresponding to the QoS stream is established on the second base station, to transmit the uplink data borne on the default DRB to the second base station and then transmit the uplink data to a core network device through the GTP channel;

wherein the apparatus is a secondary base station, and the second base station is a master base station; wherein when controlling the receiver to receive the address information of the TNL sent by the second base station, the processor is configured to:

control the receiver to receive a secondary base station addition request message sent by the master base station, wherein the secondary base station addition request message carries indication information for instructing the apparatus to establish the default DRB and the address information; or control the receiver to receive a secondary base station modification request message sent by the master base station, wherein the secondary base station modification request message carries indication information for instructing the apparatus to establish the default DRB and the address information;

correspondingly, the processor is further configured to: establish the default DRB according to the indication information or wherein the apparatus is a secondary base station, and the second base station is a master base station; wherein the apparatus further comprises:

a transmitter, configured to send a secondary base station modification request message to the master base station, wherein the secondary base station modification request message carries indication information for indicating that the default DRB is established on the apparatus;

correspondingly, when controlling the receiver to receive the address information of the TNL sent by the second base station, the processor is configured to:

control the receiver to receive a secondary base station modification request acknowledgement message sent by the master base station, wherein the secondary base station modification request acknowledgement message carries the address information;

or wherein the apparatus is a master base station, and the second base station is a secondary base station; wherein the apparatus further comprises:

a transmitter, configured to send a secondary base station addition request message to the secondary base station, wherein the secondary base station addition request message carries indication information for indicating that the default DRB is established on the apparatus;

correspondingly, when controlling the receiver to receive the address information of the TNL sent by the second base station, the processor is configured to:

control the receiver to receive a secondary base station addition request acknowledgement message sent by the secondary base station, wherein the secondary base station addition request acknowledgement message carries the address information;

or wherein the apparatus is a master base station, and the second base station is a secondary base station; wherein the apparatus further comprises:

a transmitter, configured to send a secondary base station modification request message to the secondary base station, wherein the secondary base station modification request message carries indication information for indicating that the default DRB is established on the apparatus;

correspondingly, when controlling the receiver to receive the address information of the TNL sent by the second base station, the processor is configured to:

control the receiver to receive a secondary base station modification request acknowledgement message sent by the secondary base station, wherein the secondary base station modification request acknowledgement message carries the address information;

or wherein the apparatus is a master base station, and the second base station is a secondary base station; wherein when controlling the receiver to receive the address information of the TNL sent by the second base station, the processor is configured to:

control the receiver to receive a secondary base station modification request message sent by the secondary base station, wherein the secondary base station modification request message carries indication information for instructing the apparatus to establish the default DRB and the address information;

correspondingly, the processor is further configured to: establish the default DRB according to the indication information.

4. A data sending apparatus applied to a second base station, the apparatus comprising:

a memory, configured to store instructions;

a processor, configured to read the instructions stored in the memory to perform:

determining that a default Data Radio Bearer, DRB, is established on a first base station;

controlling a transmitter to send address information of a Transport Network Layer, TNL, to the first base station to establish a connection with the first base station according to the address information when uplink data sent by a terminal device and received by the first base station needs to be borne by the default DRB and a General packet radio service Tunneling Protocol, GTP, channel corresponding to a Quality of Service, QoS, stream of the uplink data is established on the apparatus, to transmit the uplink data borne on the default DRB to the apparatus and then transmit the uplink data to a core network device through the GTP channel;

wherein the first base station is a secondary base station, and the apparatus is a master base station; wherein when controlling the transmitter to send the address information of the TNL to the first base station, the processor is configured to:

control the transmitter to send a secondary base station addition request message to the secondary base station, wherein the secondary base station addition request message carries indication information for instructing the secondary base station to establish the default DRB and the address information; or control the transmitter to send a secondary base station modification request message to the secondary base station, wherein the secondary base station modification request message carries indication information for instructing the secondary base station to establish the default DRB and the address information;

or wherein the first base station is a secondary base station, and the apparatus is a master base station: wherein the apparatus further comprises:

a receiver, configured to receive a secondary base station modification request message sent by the secondary base station, wherein the secondary base station modification request message carries indication information for indicating that the default DRB is established on the secondary base station;

correspondingly, when controlling the transmitter to send the address information of the TNL to the first base station, the processor is configured to:

control the transmitter to send a secondary base station modification request acknowledgement message to the secondary base station, wherein the secondary base station modification request acknowledgement message carries the address information;

or wherein the first base station is a master base station, and the apparatus is a secondary base station; wherein the apparatus further comprises:

a receiver configured to receive a secondary base station addition request message sent by the master base station, wherein the secondary base station addition request message carries indication information for indicating that the default DRB is established on the master base station;

correspondingly, when controlling the transmitter to send the address information of the TNL to the first base station, the processor is configured to:

control the transmitter to send a secondary base station addition request acknowledgement message to the master base station, wherein the secondary base station addition request acknowledgement message carries the address information;

or wherein the first base station is a master base station, and the apparatus is a secondary base station; wherein the apparatus further comprises:

a receiver, configured to receive a secondary base station modification request message sent by the master base station, wherein the secondary base station modification request message carries indication information for indicating that the default DRB is established on the master base station;

correspondingly, when controlling the transmitter to send the address information of the TNL to the first base station, the processor is configured to:

control the transmitter to send a secondary base station modification request acknowledgement message to the master base station, wherein the secondary base station modification request acknowledgement message carries the address information;

or wherein the first base station is a master base station, and the apparatus is a secondary base station; wherein when controlling the transmitter to send the address information of the TNL to the first base station, the processor is configured to:

control the transmitter to send a secondary base station modification request message to the master base station, wherein the secondary base station modification request message carries indication information for instructing the master base station to establish the default DRB and the address information.

\* \* \* \* \*